(12) United States Patent
Collings et al.

(10) Patent No.: US 11,372,287 B2
(45) Date of Patent: Jun. 28, 2022

(54) HOLOGRAPHIC PROJECTOR

(71) Applicant: Dualitas Ltd., Milton Keynes (GB)

(72) Inventors: Neil Collings, Milton Keynes (GB); Huan Xu, Milton Keynes (GB)

(73) Assignee: DUALITAS LTD, Milton Keynes (GB)

( * ) Notice: Subject to any disclaimer, the term of this patent is extended or adjusted under 35 U.S.C. 154(b) by 0 days.

(21) Appl. No.: 16/645,136

(22) PCT Filed: Sep. 6, 2018

(86) PCT No.: PCT/GB2018/052530
§ 371 (c)(1),
(2) Date: Mar. 6, 2020

(87) PCT Pub. No.: WO2019/048867
PCT Pub. Date: Mar. 14, 2019

(65) Prior Publication Data
US 2021/0232005 A1    Jul. 29, 2021

(30) Foreign Application Priority Data

Sep. 8, 2017 (GB) .................................... 1714493

(51) Int. Cl.
*G02F 1/1335* (2006.01)
*G02F 1/1337* (2006.01)
(Continued)

(52) U.S. Cl.
CPC .... *G02F 1/133749* (2021.01); *G02F 1/13306* (2013.01); *G02F 1/13706* (2021.01);
(Continued)

(58) Field of Classification Search
CPC ........ G02F 1/136277; G02F 1/134309; G03H 1/2294; G03H 2225/22; G03H 2225/52; G03H 2225/55; G03H 2240/61
See application file for complete search history.

(56) References Cited

U.S. PATENT DOCUMENTS 6,194,039 B1    2/2001    Gibbons et al.
2003/0063232 A1    4/2003    Hirota et al.
(Continued)

FOREIGN PATENT DOCUMENTS

GB    2496108 A    5/2013
GB    2526275 A    11/2015
(Continued)

OTHER PUBLICATIONS

International Search Report and Written Description in PCT/GB2018/052530, dated Nov. 23, 2018.
(Continued)

*Primary Examiner* — Paisley L Wilson
(74) *Attorney, Agent, or Firm* — McDonnell Boehnen Hulbert & Berghoff LLP

(57) ABSTRACT

There is provided a holographic projector comprising a reflective liquid crystal display device. The reflective liquid crystal display device comprises a light-modulating layer between a first substrate and a second substrate substantially parallel to the first substrate. The light-modulating layer comprises planar-aligned nematic liquid crystals having positive dielectric anisotropy. The first substrate is substantially transparent and comprises a first alignment layer arranged to impart a first pre-tilt angle $\theta_1$ on liquid crystals proximate the first substrate, wherein $\theta_1 > 5°$. The second substrate is substantially reflective and comprises a second alignment layer arranged to impart a second pre-tilt angle $\Theta_2$ on liquid crystals proximate the second substrate, wherein $\theta_2 > 5°$. The reflective liquid crystal display device further comprises a plurality of pixels defined on the light-modulating layer having a pixel repeat distance x, wherein $x \leq 10$ μm. The distance d between inside faces of the first substrate and second substrate satisfies $0.5\ \mu m \leq d \leq 3\ \mu m$, and the birefringence of the liquid crystal $\Delta\eta \geq 0.20$. The holographic (Continued)

projector further comprises a display driver arranged to drive the reflective liquid crystal display device to display a hologram by independently-driving each pixel at a respective modulation level selected from a plurality of modulation levels having a phase modulation value.

20 Claims, 17 Drawing Sheets

(51) Int. Cl.

| | | |
|---|---|---|
| G02F 1/137 | (2006.01) | |
| G02F 1/133 | (2006.01) | |
| G02F 1/1343 | (2006.01) | |
| G02F 1/1362 | (2006.01) | |
| G03H 1/22 | (2006.01) | |
| G02B 27/01 | (2006.01) | |
| G03B 21/00 | (2006.01) | |

(52) U.S. Cl.
CPC .. *G02F 1/133738* (2021.01); *G02F 1/133784* (2013.01); *G02F 1/134309* (2013.01); *G02F 1/136277* (2013.01); *G03H 1/2202* (2013.01); *G03H 1/2286* (2013.01); *G03H 1/2294* (2013.01); *G02B 2027/0109* (2013.01); *G02F 2203/02* (2013.01); *G03B 21/006* (2013.01); *G03H 2001/2231* (2013.01); *G03H 2225/22* (2013.01); *G03H 2225/52* (2013.01); *G03H 2225/55* (2013.01); *G03H 2240/61* (2013.01)

(56) References Cited

U.S. PATENT DOCUMENTS

| | | |
|---|---|---|
| 2004/0227875 A1 | 11/2004 | Park et al. |
| 2006/0114390 A1 | 6/2006 | Choi |
| 2007/0216837 A1 | 9/2007 | Ono |
| 2009/0191656 A1 | 7/2009 | Inoue et al. |
| 2010/0245954 A1 | 9/2010 | Ahling |
| 2010/0271583 A1 | 10/2010 | Ge et al. |
| 2013/0265622 A1 | 10/2013 | Christmas et al. |
| 2014/0253987 A1 | 9/2014 | Christmas |
| 2015/0022526 A1 | 1/2015 | Christmas |
| 2015/0293409 A1* | 10/2015 | Usukura .............. G02B 30/27 349/15 |
| 2016/0004126 A1* | 1/2016 | Leister ................ G02F 1/292 349/123 |
| 2016/0152894 A1 | 6/2016 | Yoon et al. |
| 2017/0082855 A1 | 3/2017 | Christmas et al. |
| 2017/0115627 A1 | 4/2017 | Christmas et al. |
| 2017/0363869 A1 | 12/2017 | Christmas et al. |
| 2017/0364028 A1 | 12/2017 | Christmas et al. |
| 2018/0046138 A1 | 2/2018 | Christmas et al. |
| 2018/0120768 A1 | 5/2018 | Christmas |
| 2018/0188532 A1 | 7/2018 | Christmas et al. |
| 2018/0307070 A1 | 10/2018 | Fujisawa |
| 2019/0041641 A1 | 2/2019 | Christmas et al. |
| 2019/0064738 A1 | 2/2019 | Cole et al. |

FOREIGN PATENT DOCUMENTS

| | | |
|---|---|---|
| GB | 2554575 A | 4/2018 |
| GB | 2567409 A | 4/2019 |
| GB | 2567410 A | 4/2019 |
| GB | 2569206 A | 6/2019 |
| GB | 2569208 A | 6/2019 |
| JP | H07-49509 A | 2/1995 |
| JP | H07-294936 A | 11/1995 |
| JP | H07-301813 A | 11/1995 |
| JP | 2003-107530 A | 4/2003 |
| JP | 2007-248699 A | 9/2007 |
| JP | 2013-540278 A | 10/2013 |
| WO | 2007/111402 A1 | 10/2007 |
| WO | 2018078366 A1 | 5/2018 |
| WO | 2018100394 A1 | 6/2018 |
| WO | 2018100397 A1 | 6/2018 |

OTHER PUBLICATIONS

Combined Search and Examination Report, United Kingdom Patent Application GB1714493.2, dated Mar. 8, 2018.
Z. Zhang et al., "Fundamentals of phase-only liquid crystal on silicon (LCOS) devices," Light: Science and Applications, 3, e213 (2014) (10 pages).
X. Wang et al., "Modeling and design of an optimized liquid-crystal optical phased array," J. App. Phys, 98, 073101 (2005) (8 pages).
M. Wang et al., "LCoS SLM Study and Its Application in Wavelength Selective Switch," Photonics, 4, 22 (2017) (16 pages).

* cited by examiner

HOLOGRAPHIC PROJECTOR

CROSS-REFERENCE TO RELATED APPLICATIONS

This application is a U.S. National Stage application of International Patent Application PCT/GB2018/052530, filed Sep. 6, 2018, which claims the benefit of priority of United Kingdom Patent Application no. 1714493.2, filed Sep. 8, 2017.

FIELD

The present disclosure relates to a projector. More specifically, the present disclosure relates to a holographic projector, holographic projection system and method of fabricating a projector such as a holographic projector. The present disclosure also relates to a method of reducing fringing field effects in a liquid crystal display and a method of reducing the effect of disclinations in a liquid crystal display. More specifically, some embodiments relate to a method of displacing the disclination line in a liquid crystal cell. Some embodiments relate to a head-up display and a head-mounted display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example.

The present disclosure relates to a liquid crystal display device in which the local orientation of the liquid crystal is described by an n-director or, simply, director. In some cases, pixelated liquid crystal devices can suffer from the effects of so-called fringing fields. Fringing fields are non-uniformities in the electric fields which determine the local orientation of the liquid crystal director. Fringing fields result from each pixel being subjected to unwanted horizontal electric-fields from the adjacent pixels which effect the vertical electric field representing the data voltage. Fringing fields therefore distort the orientation of the liquid crystals and have a detrimental effect on the performance of the display device.

In a display device which modulates phase, fringing field effects result in a loss of birefringence and non-uniform phase retardation. For example, the inventors have found that fringing field effects result in a 15-30% loss of phase retardation with 4 μm pixels and a cell gap of a few micrometers. This can degrade the quality of the holographic projection, due to light diffraction at disclination lines and the loss of retardation.

Attempts have been made to reduce fringing field effects by, for example, altering the shape of the electrodes or including dielectric shield wall structures. However, such approaches are complex because they require microstructures which need surface processing.

U.S. Pat. No. 6,473,149 discloses a spacer material arranged to impede the formation of a bend deformation in the liquid crystal in the interpixel region which eliminates the so-called reverse tilt disclination.

There is disclosed herein a simple approach which significantly reduces the effect of fringing fields at least when the density of pixels is high and fast-switching of each pixel in the full range of phase retardation from 0 to 2π is required for phase holography.

SUMMARY

Aspects of the present disclosure are defined in the appended independent claims.

Many different types of display device exist. The present disclosure relates to a reflective liquid crystal display device having high resolution (high density of pixels) and fast-switching pixels for holographic projection at video rates using phase holograms. In accordance with the present disclosure, a high-resolution display is defined as one in which the pixel pitch is less than or equal to 10 μm. High quality holographic projection requires pixels which can provide up to 2π phase retardation. The total retardation in a reflective cell, ϕ, satisfies the equation:

$$\Phi = \frac{4\pi d \Delta n}{\lambda}$$

where d is the cell gap, Δn is the birefringence of the liquid crystal and λ is the wavelength of the light. The product dΔn is known as the path difference. The present disclosure relates to a planar-aligned nematic cell comprising liquid crystals having positive dielectric anisotropy because this configuration is found to be effective for phase holography. The response time of such a cell is linked to the square of the cell gap. The present disclosure provides fast-switching phase retardation up to 2π by operating within the limits 0.5 μm≤d≤3 μm and Δn≥0.20.

With some types of liquid crystal display, fringing fields can cause the appearance so-called disclinations in the pixels which degrade performance. It is found that disclinations are particularly pronounced in the type of reflective liquid crystal display device in accordance with the present disclosure. It is further found that the particular disclinations which occur in the device in accordance with the present disclosure are problematic when the device is used to display a phase hologram and fast-switching from 0 to 2π is required.

There is provided a holographic projector comprising a reflective liquid crystal display device and a display driver. The reflective liquid crystal display device comprises a light modulating layer, a first substrate, a second substrate and a plurality of pixels. The light-modulating layer is between the first substrate and the second substrate. The second substrate is substantially parallel to the first substrate. The light-modulating layer comprises planar-aligned nematic liquid crystals having positive dielectric anisotropy. The first substrate is substantially transparent and comprises a first alignment layer arranged to impart a first pre-tilt angle $\theta_1$ on liquid crystals proximate the first substrate, wherein $\theta_1 > 5°$. The second substrate is substantially reflective and comprises a second alignment layer arranged to impart a second pre-tilt angle $\theta_2$ on liquid crystals proximate the second substrate, wherein $\theta_2 > 5°$. The plurality of pixels is defined on the light-modulating layer and have a pixel repeat distance x, wherein $x \leq 10$ μm. The distance, d, between inside faces of the first substrate and second substrate is 0.5 μm $\leq d \leq 3$ μm. The birefringence of the liquid crystal, $\Delta n$, is equal to or greater than 0.20. The display driver is arranged to drive the reflective liquid crystal display device to display a hologram by independently-driving each pixel at a respective modulation level selected from a plurality of modulation levels having a phase modulation value. The plurality of modulation levels is provided by applying a variable voltage (typically 0V to 5 or 6V) between respective electrodes on the first and second substrates.

The inventors have found that changing the polar pre-tilt angle of the liquid crystals by a few degrees changes the position of the disclination by a few micrometers. The inventors have found that with the particular cells in accordance with the present disclosure, it is possible to effectively move the disclination out of the active area of the respective pixel and into the inter-pixel gap area, where it does not degrade performance, by using a pre-tilt angle on both substrates of at least 5 degrees and a cell gap of 0.5 to 3 μm. This approach is simple and easily implemented using an alignment layer. The person skilled in the art of fabrication of liquid crystal cells will know how to provide the alignment layers disclosed herein and a detailed description is not therefore provided here. The present approach is particularly advantageous over other approaches using micro-structures at least owing to its simplicity.

The first pre-tilt angle may be equal to or less than 15°. Additionally, or alternatively, the second pre-tilt angle may also be equal to or less than 15°. It is found that as the pre-tilt angle increases, the liquid crystals take longer to relax from an applied electric field and, furthermore, a higher cell gap is required to maintain the phase retardation. For cells in accordance with the present disclosure, it is found that these disadvantages can outweigh the advantage of reducing fringing field effects if the pre-tilt angle is greater than 15 degrees. In general, there is little evidence of a further reduction in disclination line displacement above 15 degrees.

The pixel repeat distance may be equal to or less than 6 μm. With a liquid crystal cell in accordance with the present disclosure, it is found that a pre-tilt angle greater than 5 degrees is particularly effective if the pixel repeat distance or pitch pixel is equal to or less than 6 μm.

The distance, d, between inside faces of the first substrate and second substrate may be equal to or greater than 1 μm and equal to or less than 3 μm. It is found that if d is less than 1 μm, the device can become very difficult to manufacture and exotic liquid crystal mixtures having very high birefringence are required to achieve the required full range of phase retardation.

The birefringence may be equal to or greater than 0.25, such as equal to or greater than 0.3. The fringing field effects described herein are observed in relatively thin cells. Thin cells require higher birefringence liquid crystals in order to achieve the full range of phase retardation necessary for high quality phase holography.

The birefringence may be equal to or less than 0.70, such as equal to or less than 0.6. At higher birefringence, switching speed may be compromised because such materials are usually more viscous. Furthermore, the liquid crystal can become sensitive to blue light and experience photodegradation which is problematic for the device in accordance with the present disclosure.

The first pre-tilt angle and second pre-tilt angle may be parallel. The inventors have found that the concept described herein is less effective in a so-called anti-parallel pre-tilt configuration such as found in a Pi-cell. The light-modulating layer in accordance with the present disclosure does not therefore require a bias voltage—unlike a Pi-cell, for example. The inventors have found that the disclination position is less responsive to pre-tilt angle in an anti-parallel arrangement.

The first pre-tilt angle and second pre-tilt angle may be substantially equal which makes fabrication easier.

Embodiments of the present disclosure relate to a non-twisted liquid crystal configuration such as a non-twisted nematic configuration. When the liquid crystal configuration includes a twist, the behaviour of the cell is very different. Specifically, the response of the liquid crystals in a twisted configuration to voltage is very different to the response of liquid crystals in accordance with the present disclosure. That is, in accordance with the present disclosure, the first alignment layer may be further arranged to impart a first azimuthal angle on liquid crystals proximate the first substrate and the second alignment layer may be further arranged to impart a second azimuthal angle on liquid crystals proximate the second substrate, wherein the first azimuthal angle and second azimuthal angle are substantially parallel. In simple terms, there is no twist.

The holographic projector may further comprise a light source arranged to irradiate the reflective liquid crystal device with linearly polarised light having a polarisation direction substantially parallel to the first azimuthal angle.

Adjacent pixels of the plurality of pixels may have inter-pixel gaps of 0.1 to 0.4 μm. Large fringing field effects have been observed in this range and so the concept disclosed herein is particularly effective within this range.

There is also provided a method of reducing fringing field effects, such as displacing the disclinations, in a reflective liquid crystal device. The reflective liquid crystal device comprises a light-modulating layer between a first substrate and a second substrate substantially parallel to the first substrate. The light-modulating layer comprises planar-aligned nematic liquid crystals having positive dielectric anisotropy. The first substrate is substantially transparent and comprises a first alignment layer. The second substrate is substantially reflective and comprises a second alignment layer. The light modulating layer further comprises a plurality of pixels defined on the light-modulating layer having a pixel repeat distance x, wherein x≤10 μm and 0.5 μm≤d≤3 μm, wherein d is the distance between inside faces of the first substrate and second substrate and Δn≥0.20, wherein Δn is the birefringence of the liquid crystal. The method comprises imparting a first pre-tilt angle $\theta_1$ on liquid crystals proximate the first substrate, wherein $\theta_1$>5° and imparting a second pre-tilt angle $\theta_2$ on liquid crystals proximate the second substrate, wherein $\theta_2$>5°.

The step of imparting a first/second pre-tilt angle may comprise rubbing the first/second alignment layer in an alignment direction.

The method may further comprise driving the reflective liquid crystal display device to display a hologram by independently-driving each pixel at a respective modulation level selected from a plurality of modulation levels having a phase modulation value.

If d is greater than 3 μm, it can be more difficult to display a sequence of holograms at video rate because the liquid crystal response time increases with d but it is found that fringing field effects can be reduced in accordance with the present disclosure for cell gaps up to 5 μm. Therefore, in other examples, 0.5 μm≤d≤5 μm. There is therefore also provided a holographic projector comprising a reflective liquid crystal display device and a display driver. The reflective liquid crystal display device comprises a light modulating layer, a first substrate, a second substrate and a plurality of pixels. The light-modulating layer is between the first substrate and the second substrate. The second substrate is substantially parallel to the first substrate. The light-modulating layer comprises planar-aligned nematic liquid crystals having positive dielectric anisotropy. The first substrate is substantially transparent and comprises a first alignment layer arranged to impart a first pre-tilt angle $\theta_1$ on liquid crystals proximate the first substrate, wherein $\theta_1$>5°. The second substrate is substantially reflective and comprises a second alignment layer arranged to impart a second pre-tilt angle $\theta_2$ on liquid crystals proximate the second substrate, wherein $\theta_2$>5°. The plurality of pixels is defined on the light-modulating layer and have a pixel repeat distance x, wherein x≤10 μm. The distance, d, between inside faces of the first substrate and second substrate is 0.5 μm≤d≤5 μm. The birefringence of the liquid crystal, Δn, is equal to or greater than 0.20. The display driver is arranged to drive the reflective liquid crystal display device to display a hologram by independently-driving each pixel at a respective modulation level selected from a plurality of modulation levels having a phase modulation value.

There is provided a reflective liquid crystal display device. The reflective liquid crystal display device comprises a light modulating layer, a first substrate, a second substrate and a plurality of pixels. The light-modulating layer is between the first substrate and the second substrate. The second substrate is substantially parallel to the first substrate. The light-modulating layer comprises planar-aligned nematic liquid crystals having positive dielectric anisotropy. The first substrate is substantially transparent and comprises a first alignment layer arranged to impart a first pre-tilt angle $\theta_1$ on liquid crystals proximate the first substrate, wherein $\theta_1$>5°. The second substrate is substantially reflective and comprises a second alignment layer arranged to impart a second pre-tilt angle $\theta_2$ on liquid crystals proximate the second substrate, wherein $\theta_2$>5°. The plurality of pixels is defined on the light-modulating layer and have a pixel repeat distance x, wherein x≤10 μm. The distance, d, between inside faces of the first substrate and second substrate is 0.5 μm≤d≤3 μm. The birefringence of the liquid crystal, Δn, is equal to or greater than 0.20.

There is provided a holographic projector comprising a reflective liquid crystal display device and a display driver. The reflective liquid crystal display device comprises a light modulating layer, a first substrate, a second substrate and a plurality of pixels. The light-modulating layer is between the first substrate and the second substrate. The second substrate is substantially parallel to the first substrate. The light-modulating layer comprises planar-aligned nematic liquid crystals having positive dielectric anisotropy. The first substrate is substantially transparent and comprises a first alignment layer arranged to impart a first pre-tilt angle $\theta_1$ on liquid crystals proximate the first substrate, wherein $\theta_1$>5°. The second substrate is substantially reflective and comprises a second alignment layer arranged to impart a second pre-tilt angle $\theta_2$ on liquid crystals proximate the second substrate, wherein $\theta_2$>5°. The plurality of pixels is defined on the light-modulating layer and have a pixel repeat distance x, wherein x≤10 μm. The product d·Δn≥0.2, such as ≥0.30, wherein d is the distance between inside faces of the first substrate and second substrate and Δn is the birefringence of the liquid crystal. The display driver is arranged to drive the reflective liquid crystal display device to display a hologram by independently-driving each pixel at a respective modulation level selected from a plurality of modulation levels having a phase modulation value.

There is also provided a holographic projector comprising a liquid crystal display device and a display driver. The liquid crystal display device comprises a light modulating layer, a first substrate, a second substrate and a plurality of pixels. The light-modulating layer is between the first substrate and the second substrate. The second substrate is substantially parallel to the first substrate. The light-modulating layer comprises planar-aligned nematic liquid crystals having positive dielectric anisotropy. The first substrate is substantially transparent and comprises a first alignment layer arranged to impart a first pre-tilt angle $\theta_1$ on liquid crystals proximate the first substrate, wherein $\theta_1$>5°. The second substrate is substantially transmissive and comprises a second alignment layer arranged to impart a second pre-tilt angle $\theta_2$ on liquid crystals proximate the second substrate, wherein $\theta_2$>5°.

The plurality of pixels is defined on the light-modulating layer and have a pixel repeat distance x, wherein x≤10 μm. The distance, d, between inside faces of the first substrate and second substrate is 0.5 μm≤d≤3 μm. The birefringence of the liquid crystal, Δn, is equal to or greater than 0.20. The display driver is arranged to drive the liquid crystal display device to display a hologram by independently-driving each pixel at a respective modulation level selected from a plurality of modulation levels having a phase modulation value.

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image", "replay image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values. Thus, the SLM may be said to "display" a hologram.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated. For example, the present disclosure is applicable to fully-complex holography in which two arrays of phase-modulating pixels are used.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Reference is made throughout to "pre-tilt" angle. The person skilled in the art of liquid crystal displays will be familiar with the concept of alignment layers and pre-tilt angles. The present disclosure relates to nematic liquid crystal material comprising rod-shaped molecules. When such material is aligned (e.g. by being placed proximate an alignment layer formed by rubbing), the aligned molecules exhibit both in-plane and out-of-plane orientations of the rods. If the alignment layer has been formed by rubbing, the in-plane alignment direction of the rods is generally the same as the rubbing direction. The average out-of-plane tilt angle (the "polar angle") of the rods with respect to the substrate is the pre-tilt angle. In other word, the pre-tilt angle is the polar angle of the longitudinal axis of the liquid crystals proximate the corresponding alignment layer to the plane of the substrate.

Reference is made to "pixel repeat distance" which may also be referred to as "pixel pitch". The pixel pitch of an array of pixels is the straight-line distance between corresponding points of adjacent pixels. The term therefore reflects the periodicity of the array or frequency at which the pixels repeat. The pixel pitch comprises the sum of the pixel width and the interpixel gap. The present disclosure relates to a display device comprising an [x×y] array of pixels on a plane having a pixel pitch in the x-direction and a pixel pitch in the y-direction.

Unless stated otherwise, any birefringence value mentioned herein is the birefringence at a wavelength of 650 nm.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
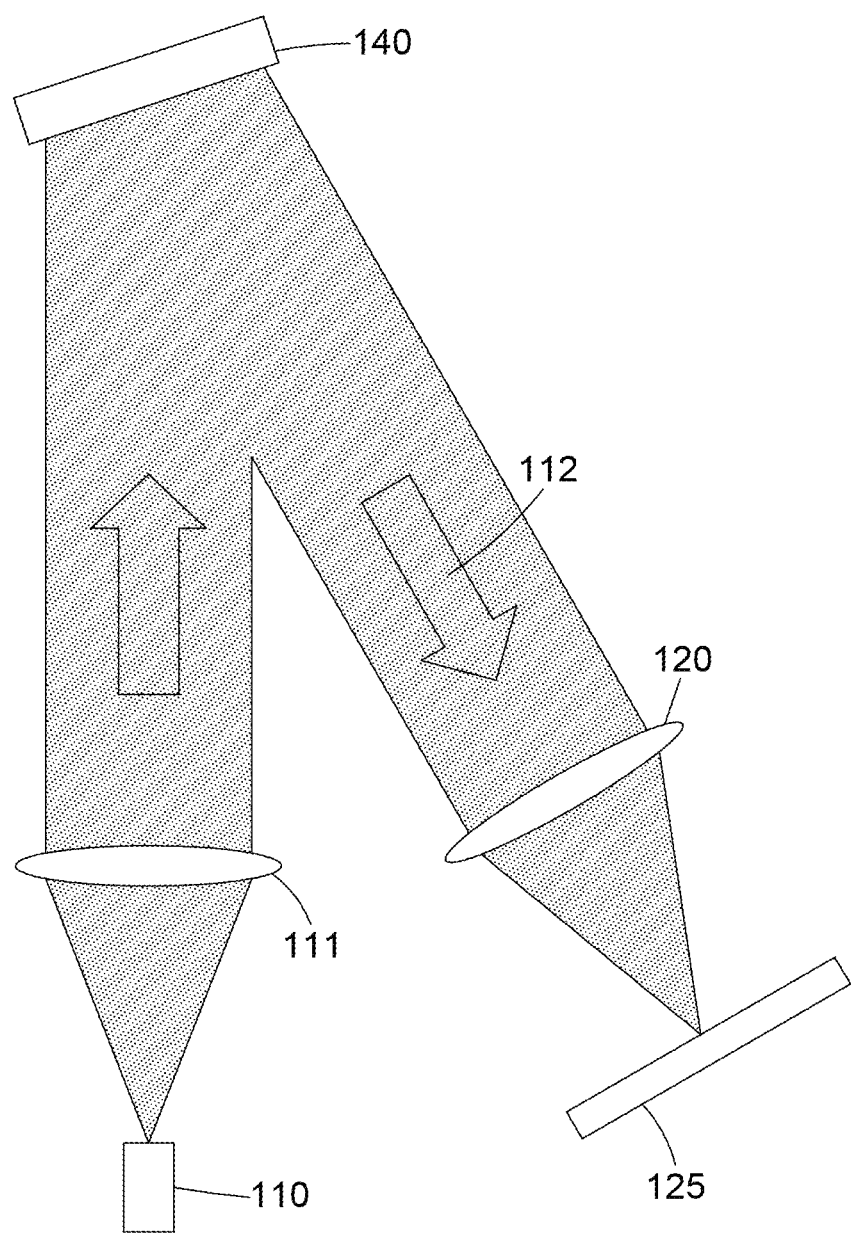
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information ψ[u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information ψ[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
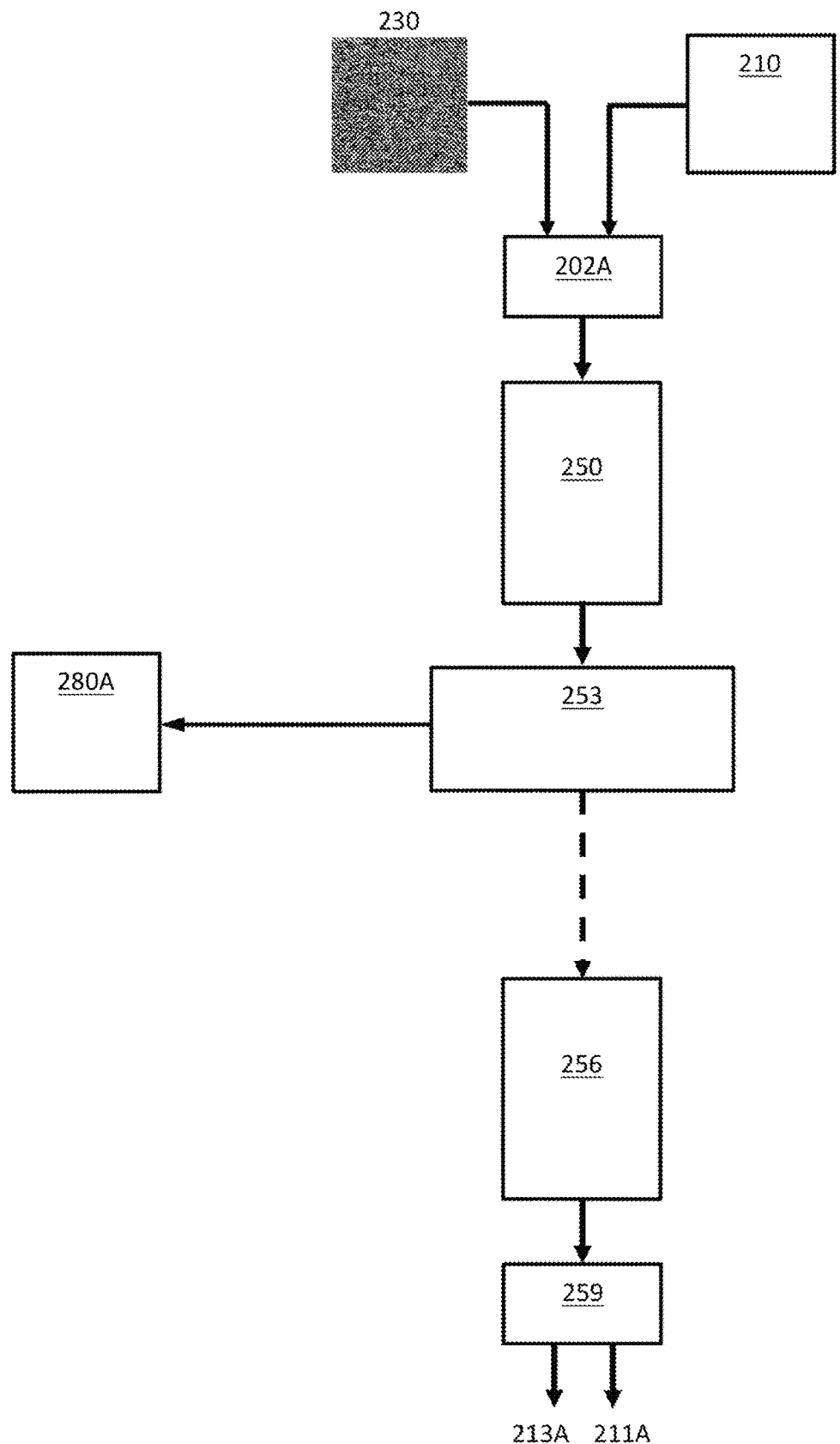
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantiles each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
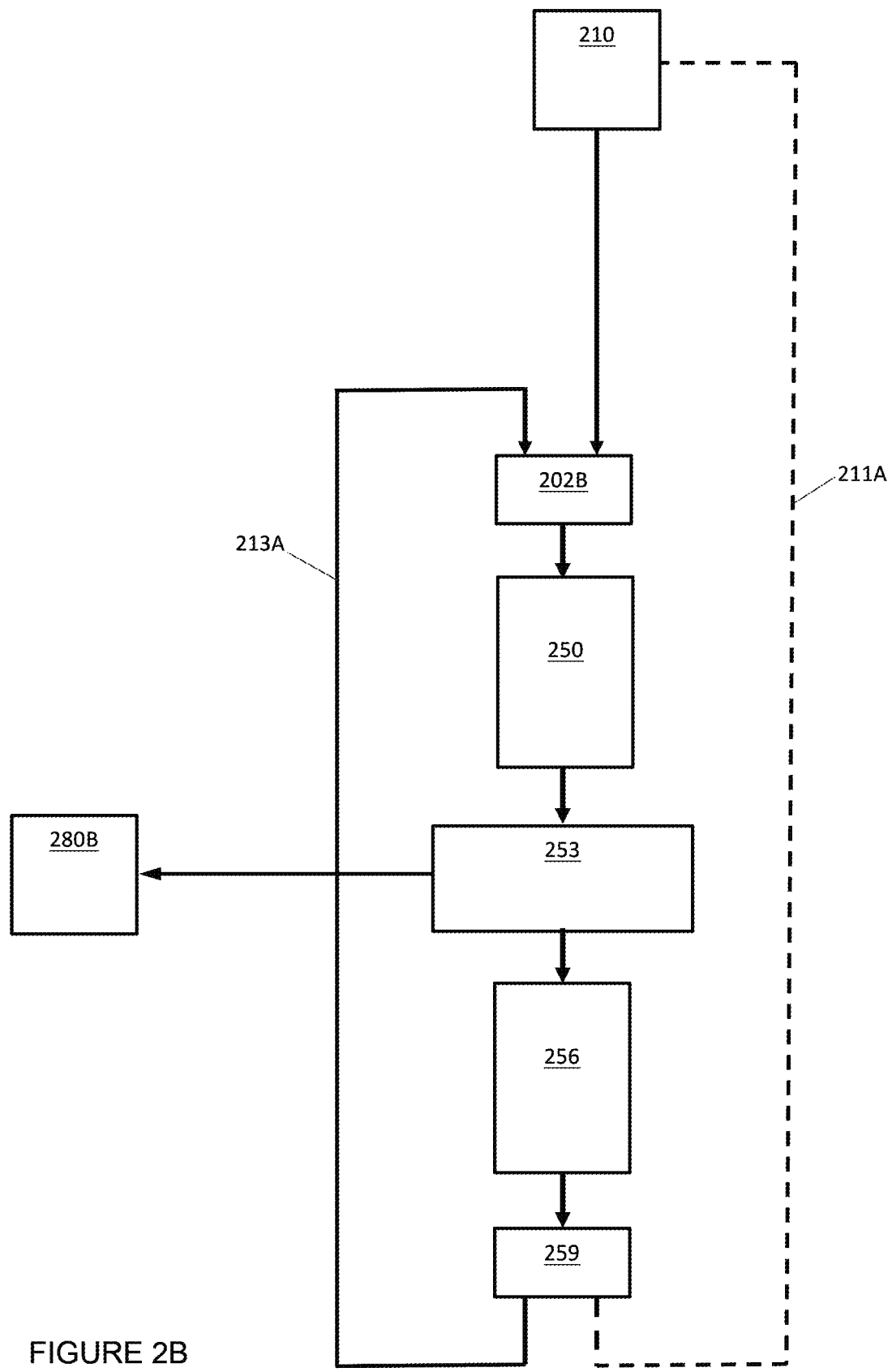
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
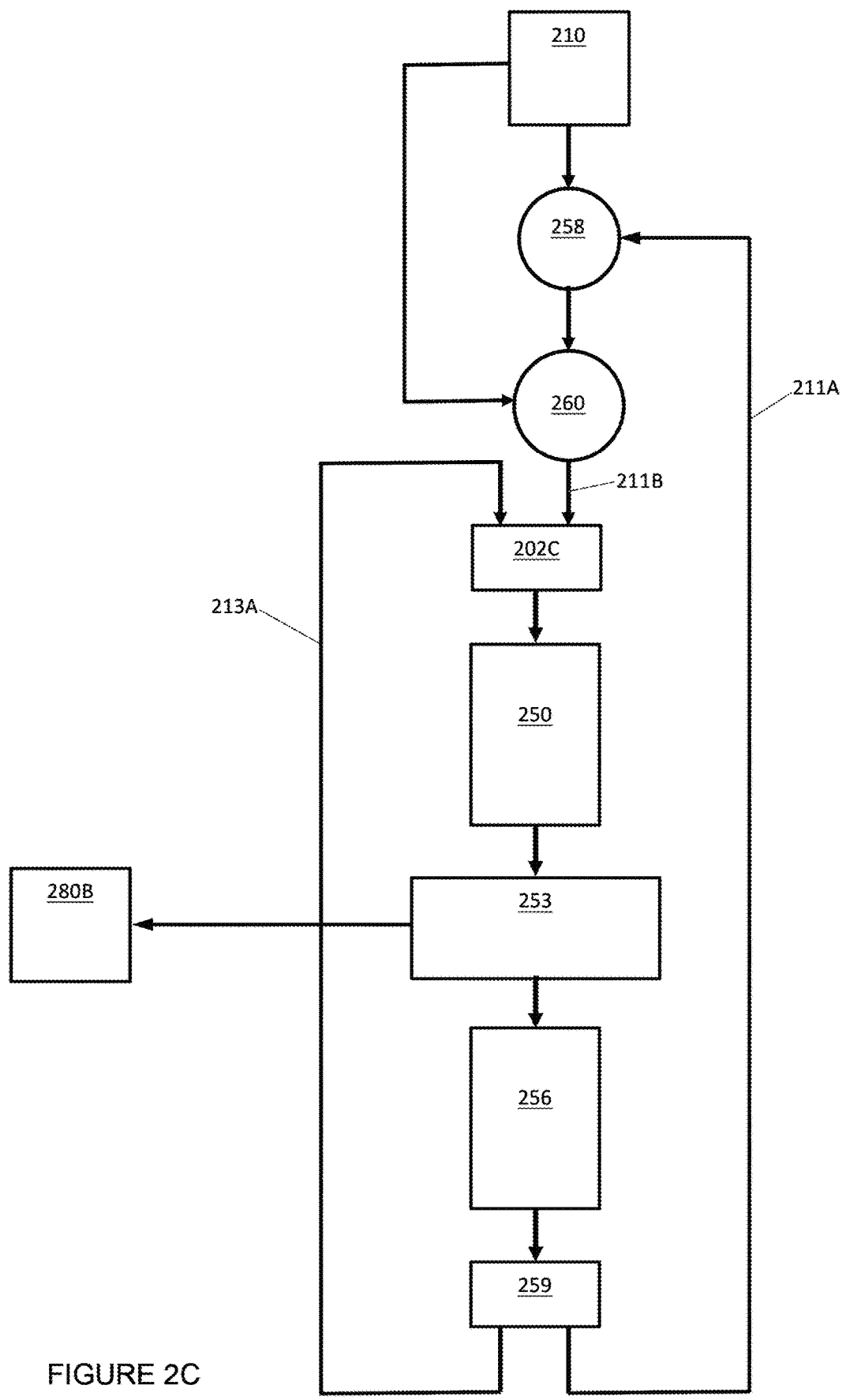
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta\cdot\exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the electro-optic component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimeters in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
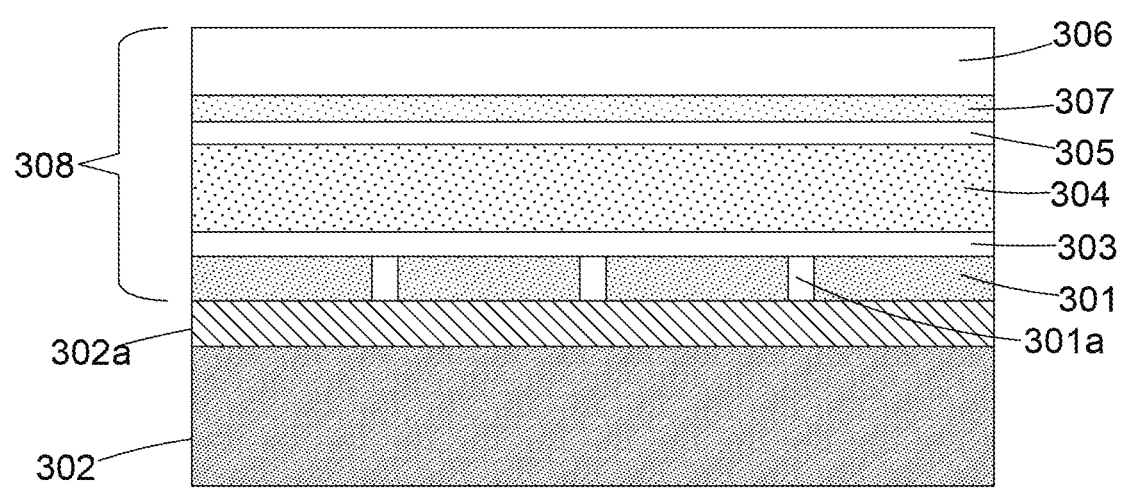
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Cell Configuration and Liquid Crystal Transition

The light-modulating layer in accordance with the present disclosure comprises liquid crystal arranged in a planar-aligned nematic (PAN) cell.

Figure 4A:
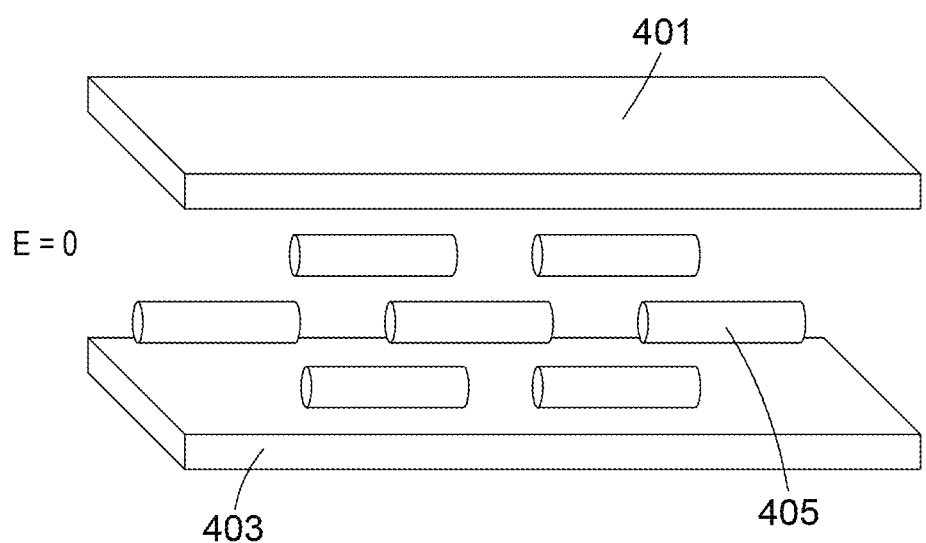
FIG. 4A shows a Freedericksz cell with the n-director in the planar state.
Figure 4B:
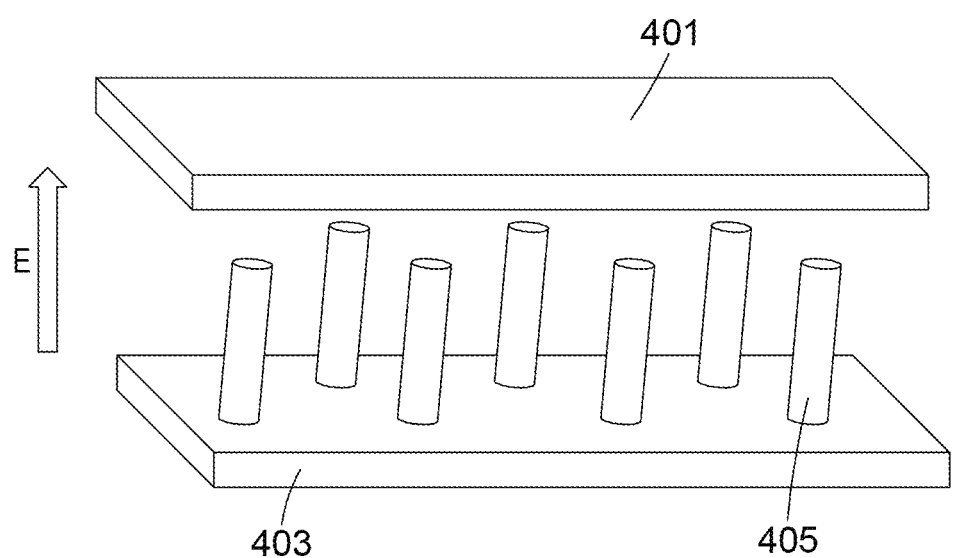
FIG. 4B shows a Freedericksz cell with the n-director in a homeotropic state due to the presence of an electric field, E.

The planar to homeotropic Freedericksz cell is also known as an Electrically Controlled Birefringence cell because when the voltage across the cell, having zero pre-tilt, exceeds the threshold voltage and the n-directors reorient in the electric field direction. This transition in orientation is known as the planar to homeotropic Freedericksz transition and is shown in FIGS. 4A and 4B. FIG. 4A shows the orientation of the liquid crystals in the absence of an electric field. FIG. 4B shows the alignment of the liquid crystals in the presence of a sufficient electric field between the first and second substrate. As a result of this transition the apparent birefringence is decreased for an incident ray of light. In the presence of a large voltage (one which is much larger than the threshold voltage) the n-directors are oriented perpendicular to the substrate, with the exception of those close to the aligning surface, this results in a very small phase retardation.

Figure 5:
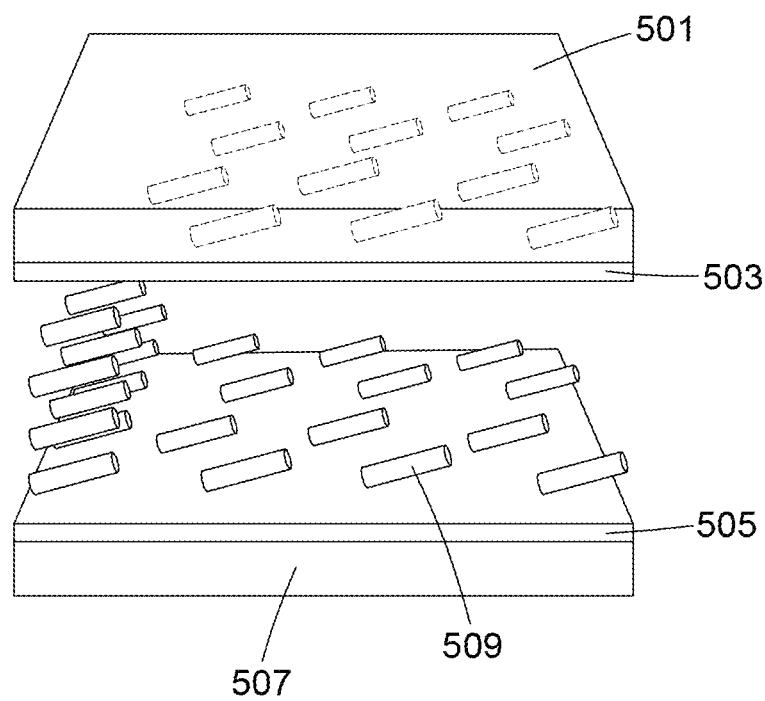
FIG. 5 is a schematic of an electrically-controlled birefringence liquid crystal on silicon device in accordance with embodiments.

In the presence of an electric field, the liquid crystal n-director can rotate in either direction (known as "forward tilt" or "reverse tilt"), in order to prevent this, an alignment layer with a built-in surface tilt, may be used. Often the alignment layer is a rubbed polymer, however, other methods may also be used to form the alignment layer. The alignment layer is applied to both substrates and for a standard ECB cell these layers are aligned in a parallel fashion as shown in FIG. 5. The planar-aligned liquid crystal cell makes an efficient phase modulator if the polarisation of the incoming light is parallel to the n-directors (long axis).

In more detail, FIG. 5 shows a first alignment layer 503 on a top glass substrate 501 and a second alignment layer 505 on a silicon backplane 507. A plurality of liquid crystal directors 509 are shown in FIG. 5 by way of example. In the absence of an electric field, the liquid crystal directors 509 align themselves in accordance with the first alignment layer 503 and second alignment layer 505. In this example, the first alignment layer 503 and second alignment layer 505 are considered parallel because the n-director of the liquid crystals proximate the top glass substrate 501 are parallel to the n-director of the liquid crystals proximate the silicon backplane 507. For example, parallel alignment layers may be formed by anti-parallel rubbing of the two alignment layers. That is, rubbing the first alignment layer in a first direction and rubbing the second alignment layer in a second direction, wherein the first direction is opposite to the second direction. In the example of FIG. 5, the first alignment layer 503 has been rubbed from right-to-left and the second alignment layer 505 has been rubbed from left-to-right (anti-parallel). Other methods of forming a parallel configuration are known in the art. In the presence of an electric field, liquid crystals may change orientation as shown in the previous figure.

The electrically controlled birefringence cell uses nematic liquid crystals with a positive dielectric anisotropy; this means that the cells switch quickly in to the homeotropic state when an electric field applied across the cell exceeds the threshold voltage.

Figure 6:
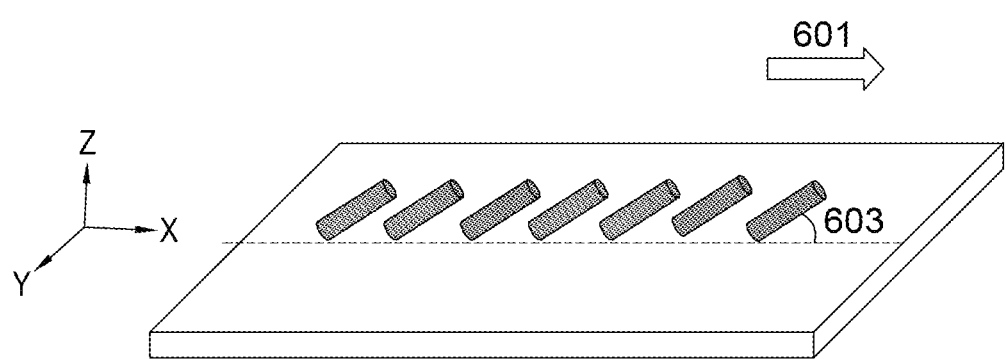
FIG. 6 shows liquid crystals having a polar pre-tilt angle in accordance with embodiments.

Typically, a low (approximately 2°) surface tilt rubbed polymer alignment layer is used on both the first substrate (e.g. front glass) and the second substrate (e.g. LCOS backplane). FIG. 6 illustrates the principle of rubbing polyimide (PI) materials in a rubbing direction 601 to create a surface pre-tilt angle 603 that is generally dependent on the type of PI used, coating conditions and the rubbing density. In embodiments, the first alignment direction provided by the first alignment layer is parallel to the second alignment direction provided by the second alignment layer.

Fringing Field Effects

Fringing fields occur when there is a difference of potential between neighbouring pixels. These fringing fields distort the n-director at the boundary between the pixels so that there is a loss in phase retardation at the edge of the pixel. The "distortions" occur because the liquid crystal minimizes its total configurational energy (elastic plus dielectric energy). Since the elastic energy depends on the three (or more) elastic constants, the actual elastic distortion (twist-bend, reverse tilt, etc) will depend on the liquid crystal mixture. The dielectric energy depends on the dielectric permittivity parallel and perpendicular to the director which also depend on the liquid crystal mixture. "Disclinations" are more abrupt changes in the n-director caused by a conflict between the alignment promoted by the alignment layer and the minimization of total configurational energy.

Figure 7A:
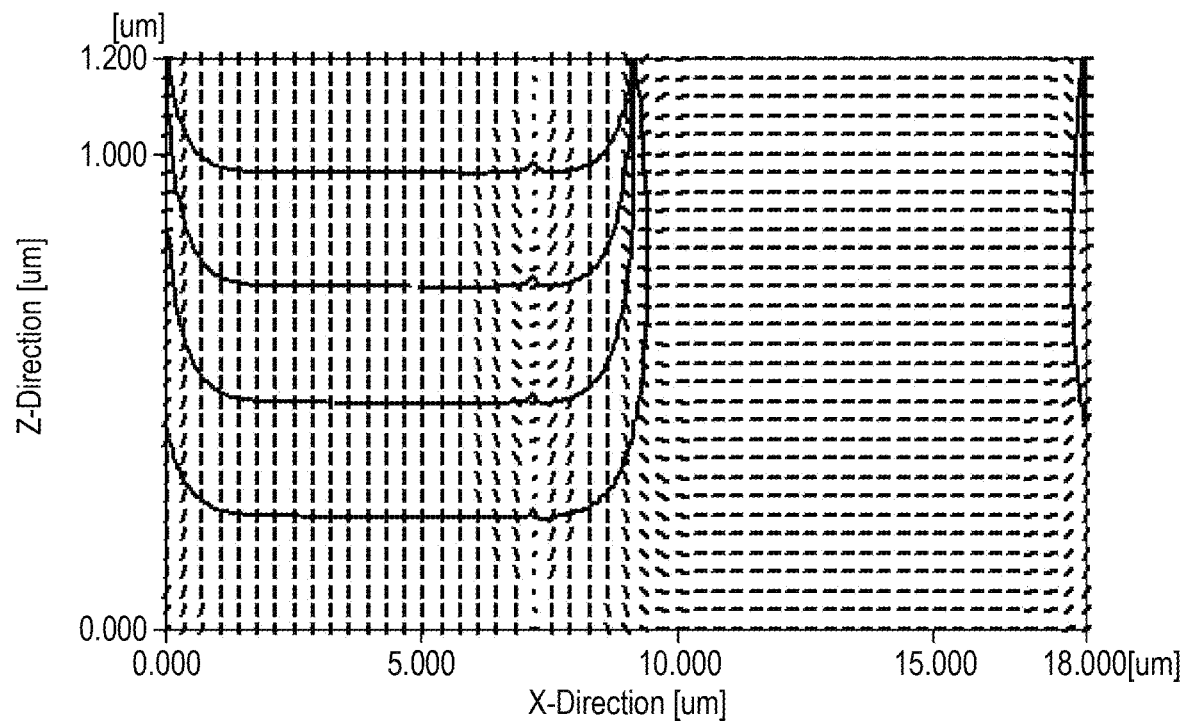
FIG. 7A shows the arrangement of liquid crystals in a pair of adjacent pixels in accordance with embodiment.

FIG. 7A is a cross-section through a pair of adjacent pixels in a device in accordance with the present disclosure. The alignment direction is in the plane of the page. The figure shows the n-directors of the liquid crystals, having a birefringence of 0.415 at 450 nm, in each pixel. Each pixel is approximately 9 µm wide in the x-direction (x-axis) and 1.2 µm thick (y-axis). The left-hand side of FIG. 7A shows a "ON" pixel in which 5V are applied across the first and second substrates (top and bottom of the cell). The lines shown are lines of equipotential. The liquid crystals in the left-hand pixel are generally aligned with the E-field (as per FIG. 4B). The right-hand pixel of FIG. 7A shows an "OFF" pixel in which there is no electrical potential across the first and second substrates. The liquid crystals in the right-hand pixel are therefore generally planar (as per FIG. 4A). The "ON" pixel (left) provides minimal phase delay and the "OFF" pixel" (right) provides maximum phase delay. The fringing fields effect the orientation of the liquid crystals in the boundary regions.

Figure 7B:
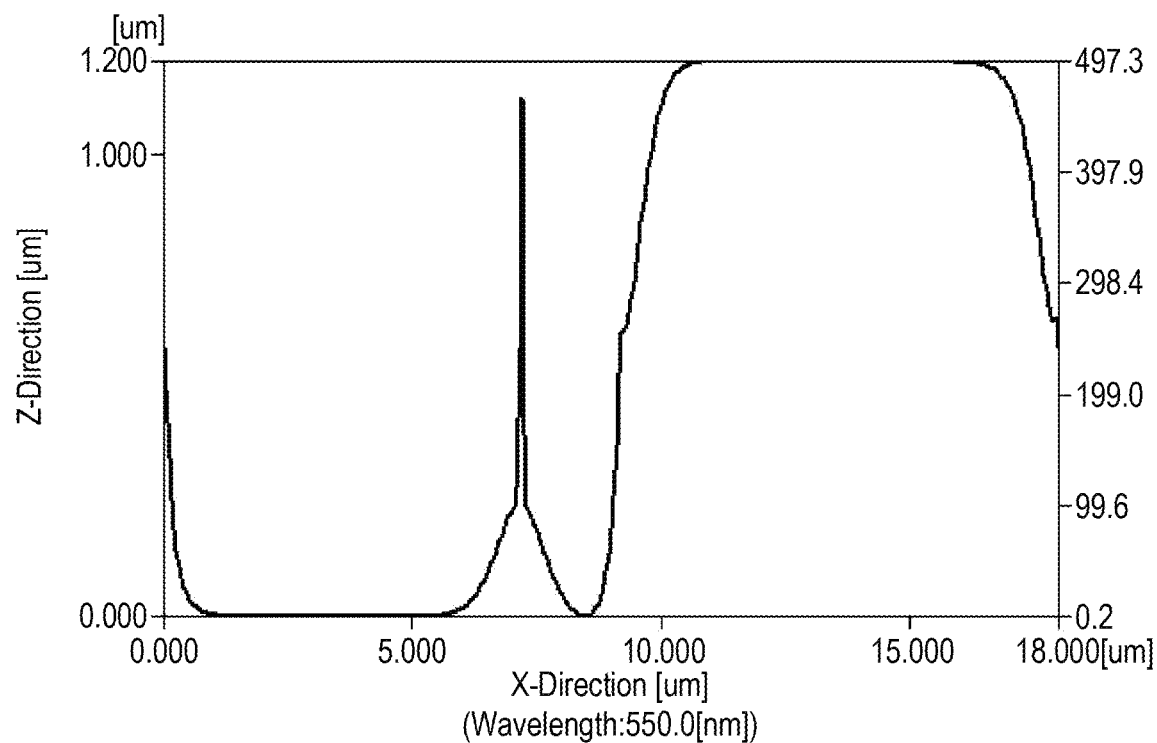
FIG. 7B shows the bulk retardation exhibited by the pair of adjacent pixels shown in FIG. 7A.

FIG. 7B shows the retardation resulting from the array of liquid crystals shown in FIG. 7A. The loss in retardation at the boundary (top corner) of the "ON" pixel (right) is the distortion described above. The sharp spike in birefringence within the "OFF" pixel (left) is the disclination.

Figure 8A:
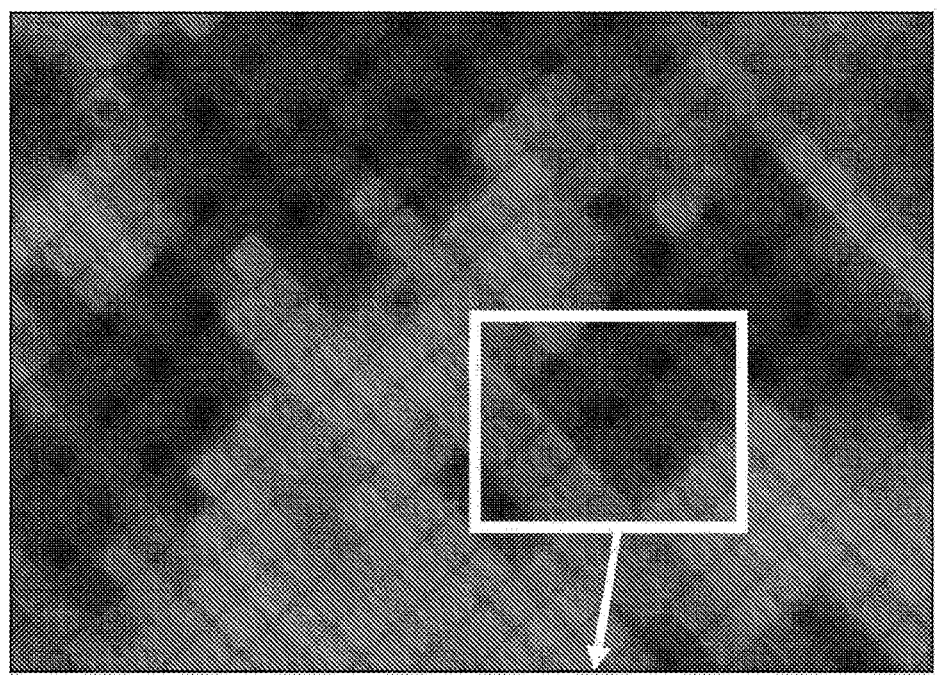
FIG. 8A is a digitally-processed optical photograph of an array of phase-modulating pixels displaying a hologram in accordance with the present disclosure.
Figure 8B:
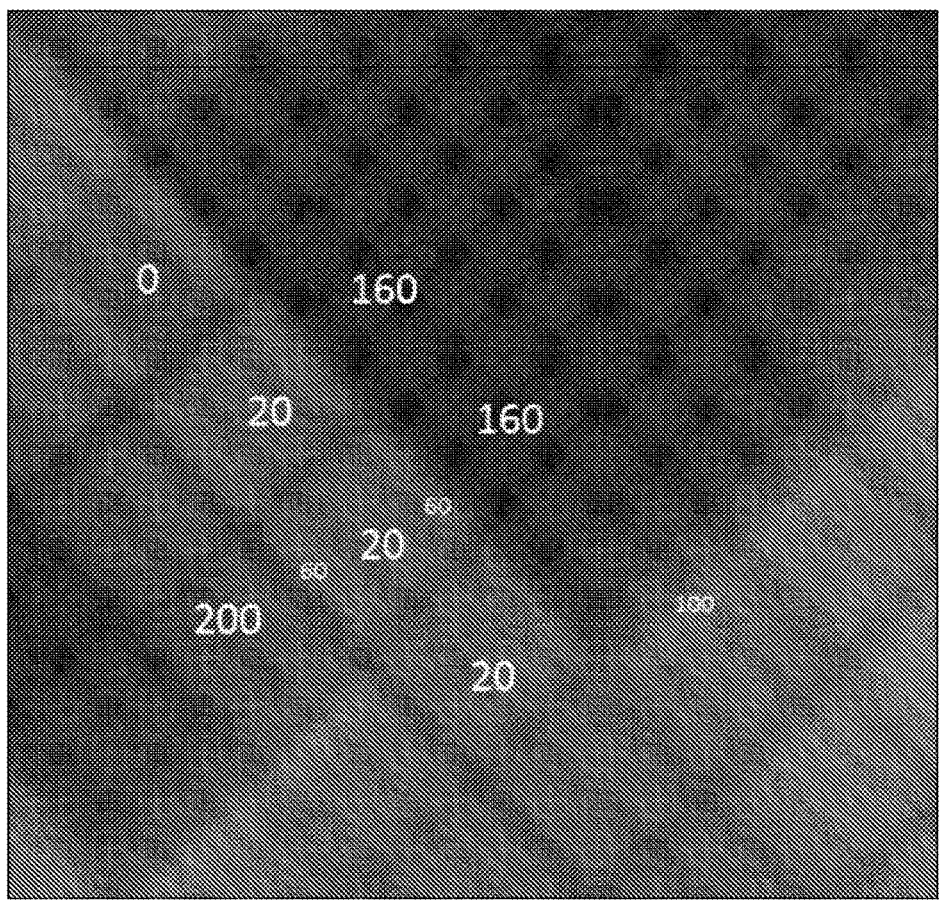
FIG. 8B is a zoomed-in image of a sub-region of FIG. 8A.

FIGS. 8A and 8B are microscope images of an array of pixels, in accordance with the present disclosure, displaying a phase hologram. The alignment direction is from SW to NE and the pattern shown is observed between a parallel polariser and analyser. The liquid crystals have a birefringence of approximately 0.256 at 590 nm and the cell gap is 2.1 µm. The image has been generated by using a white LED light source, with the cell oriented at 45 degrees between parallel polarisers. The colour indicates the retardation at the pixel which has been calibrated in terms of grey levels (numbers in FIG. 7B). Distortions (loss of phase retardation) are visible at pixel boundaries. Importantly, the loss of phase retardation occurs even when the transition between neighbouring pixels is less than the maximum. The numbers in FIG. 8B are the grey levels between 0 and 255 of selected points, wherein grey level 0 represents maximum phase retardation (e.g. $2\pi$) and grey level 255 represents minimum phase retardation (e.g. zero).

Figure 9A:
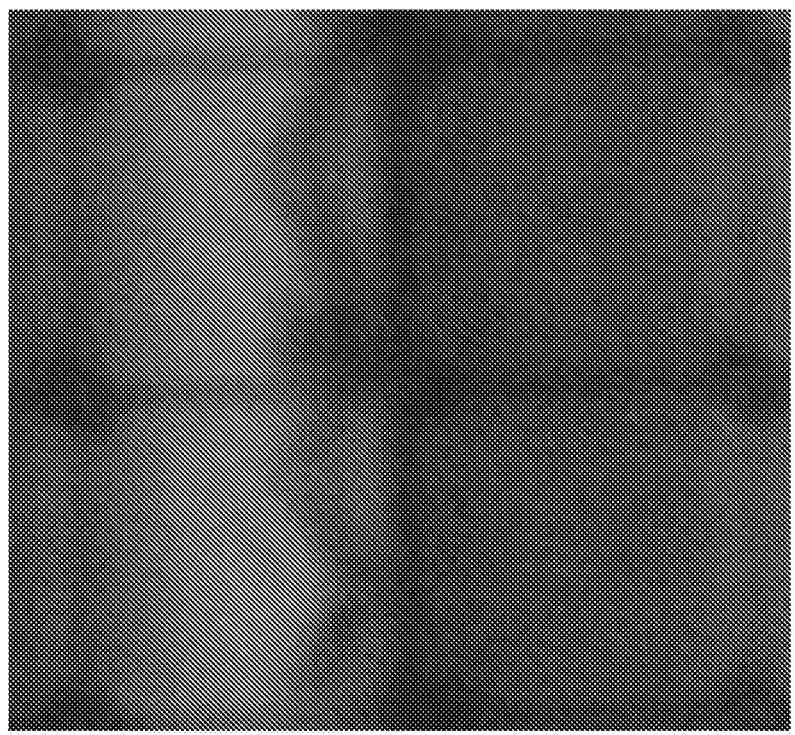
FIG. 9A is an unprocessed optical photograph of an array of phase-modulating pixels displaying a vertical grating.
Figure 9B:
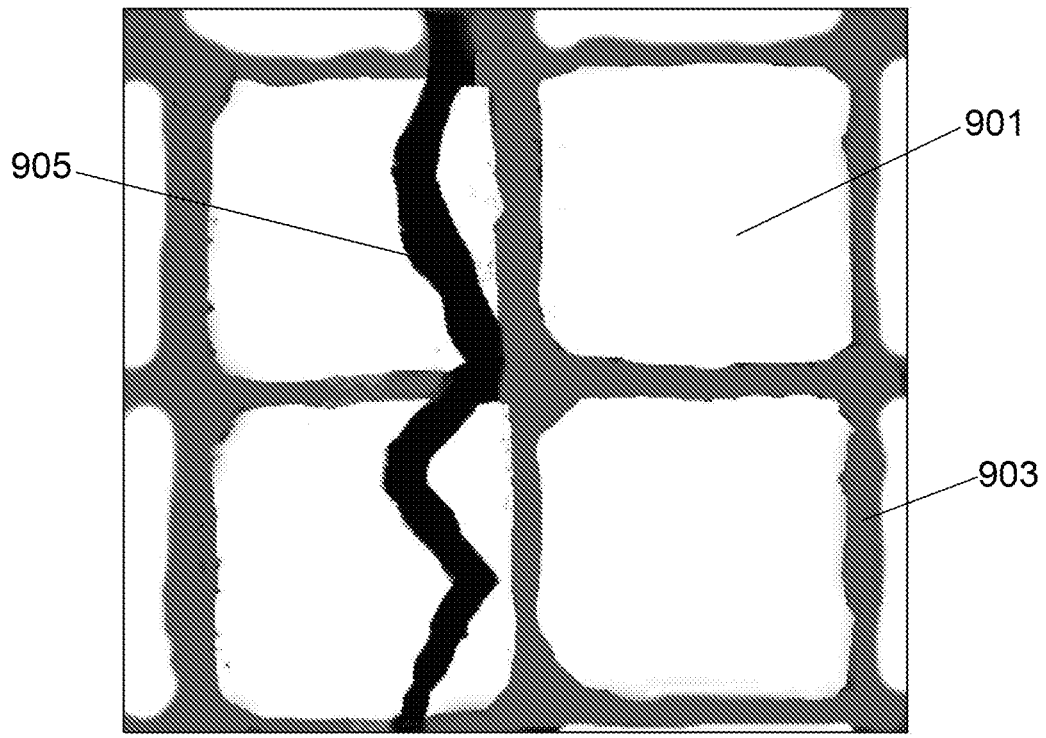
FIG. 9B is a digitally-enhanced version of FIG. 9A in order to highlight the disclination line.

FIG. 9A is an image of a group of pixels, comprising liquid crystals having a birefringence of approximately 0.30 at 450 nm, on a LCOS device in accordance with the present disclosure. The photograph of FIG. 9A has been taken in reflection using a blue filter. The pixel repeat distance is 6 µm and the array of pixels are displaying a vertical grating so that the two pixels on the left have a high voltage and the two on the right have zero volts. FIG. 9B is a digitally-enhanced version of FIG. 9A using thresholding to highlight the disclination. Specifically, FIG. 9B shows four complete pixels such as pixel 901, an interpixel region 903 and the disclination 905.

The inventors have discovered an unexpected benefit of increasing the pre-tilt angle to at least 5 degrees when using the described device for phase holography. It is known in the art how to provide a pre-tilt angle using a first and second alignment layer in accordance with the present disclosure. For example, the pre-tilt angle may be provided by rubbing the first/second alignment layer in a rubbing/alignment direction using rubbing methods known in the art. For example, the pre-tilt angles may also be provided by mixing appropriate ratios of vertical and horizontal polyimides. In some embodiments, pre-tilt angles less than 10 degrees are provided by rubbing polyimide. In some embodiments, pre-tilt angles greater than 10 degrees are provided by photo-alignment or an evaporative process.

Figure 10:
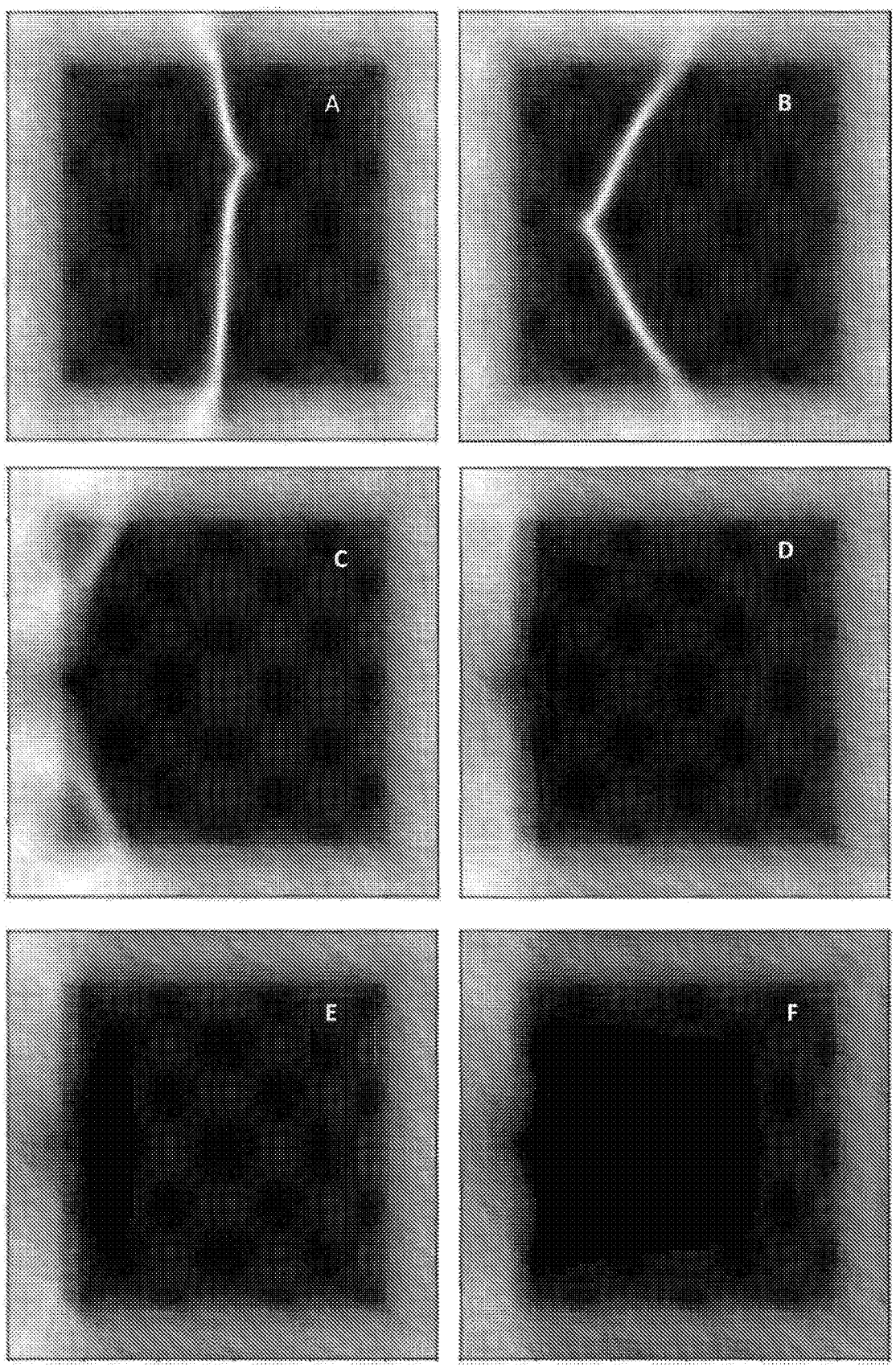
FIG. 10 show top-views of 4 μm pixels, having a cell gap of 1.2 μm, with different pre-tilt angles in accordance with embodiments.

FIG. 10 show a top view of a 1.2 µm (cell gap) pixel (drive at 5V) with different pre-tilt angles. The greyscale value represents phase retardation. The V-shaped line that is shown is the disclination (sharp change in birefringence). The pre-tilts represented in FIGS. 10A, 10B, 10C, 10D, 10E and 10F are 0, 3, 5, 7, 10 and 15 degrees, respectively. It is shown how increasing the pre-tilt moves the defect (the disclination) into the inter-pixel gap. This provides a reduction in the bulk phase retardation error. The inventors have found that this improvement is achieved because, as shown, increasing the pre-tilt effectively pushes the disclination out of the active pixel area and into the inter-pixel gaps. Each pixel therefore provides a retardation closer to that which should be expected because the sharp spike in birefringence is pushed into a non-display area.

Figure 11:
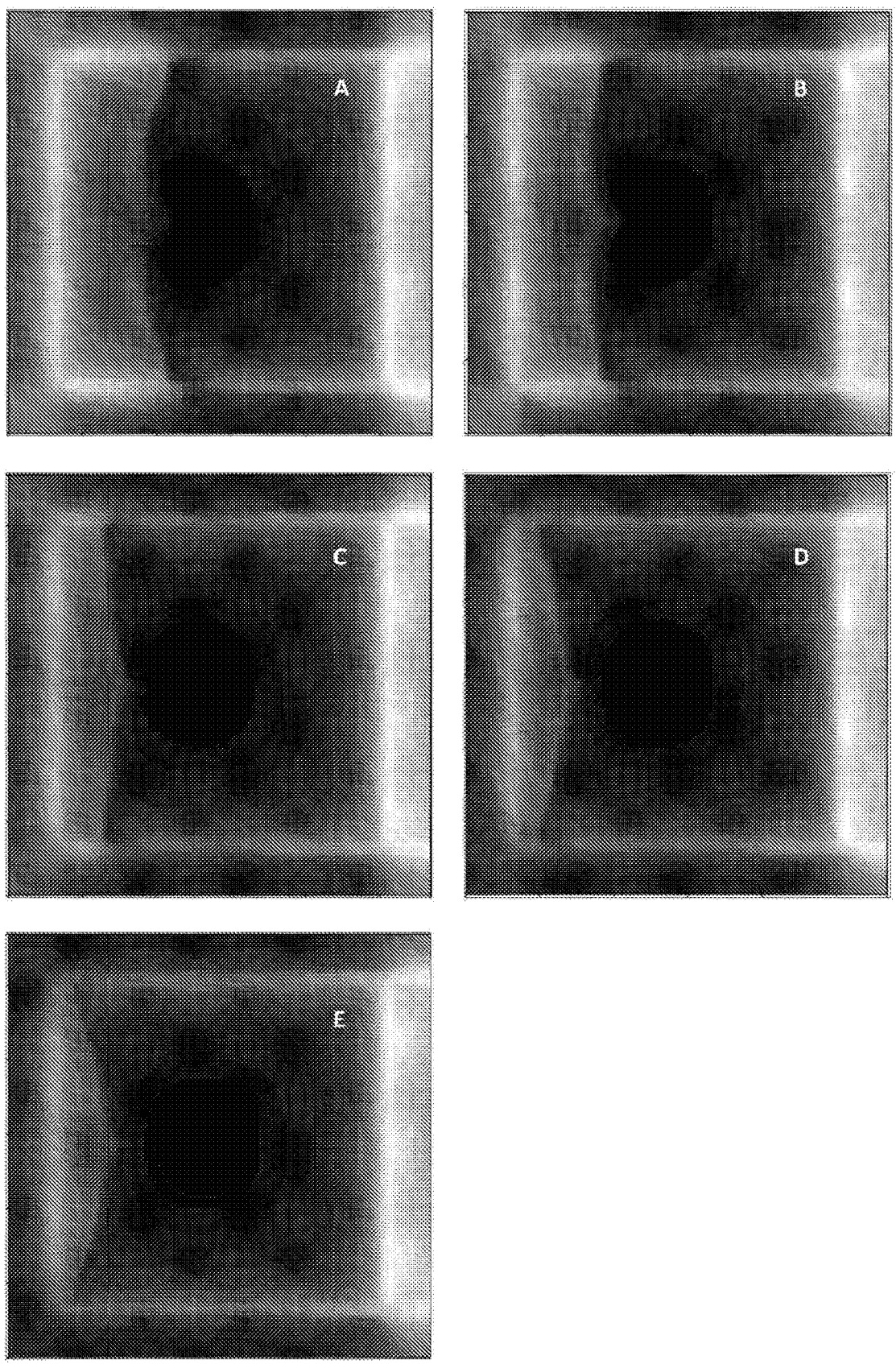
FIG. 11 shows corresponding views of 4 μm pixels having a cell gap of 5 μm.

FIG. 11 show a top view of a 5 µm (cell gap) pixel with different pre-tilts being driven at 6V. The greyscale value represents phase retardation. The defect that is shown comprises an edge disclination region induced by reverse tilted deformation of the liquid crystal molecules. The pre-tilts represented in FIGS. 11A, 11B, 11C, 11D, 11E and 11F are 3, 5, 10, 15 and 20 degrees, respectively. Again, it is shown how increasing the pre-tilt moves the defect into the inter-pixel gap which provides a reduction in the bulk phase retardation error. Increasing the pre-tilt angle enhances the stability of the liquid crystal molecules and provides more uniform orientation of the liquid crystals.

Figure 12A:
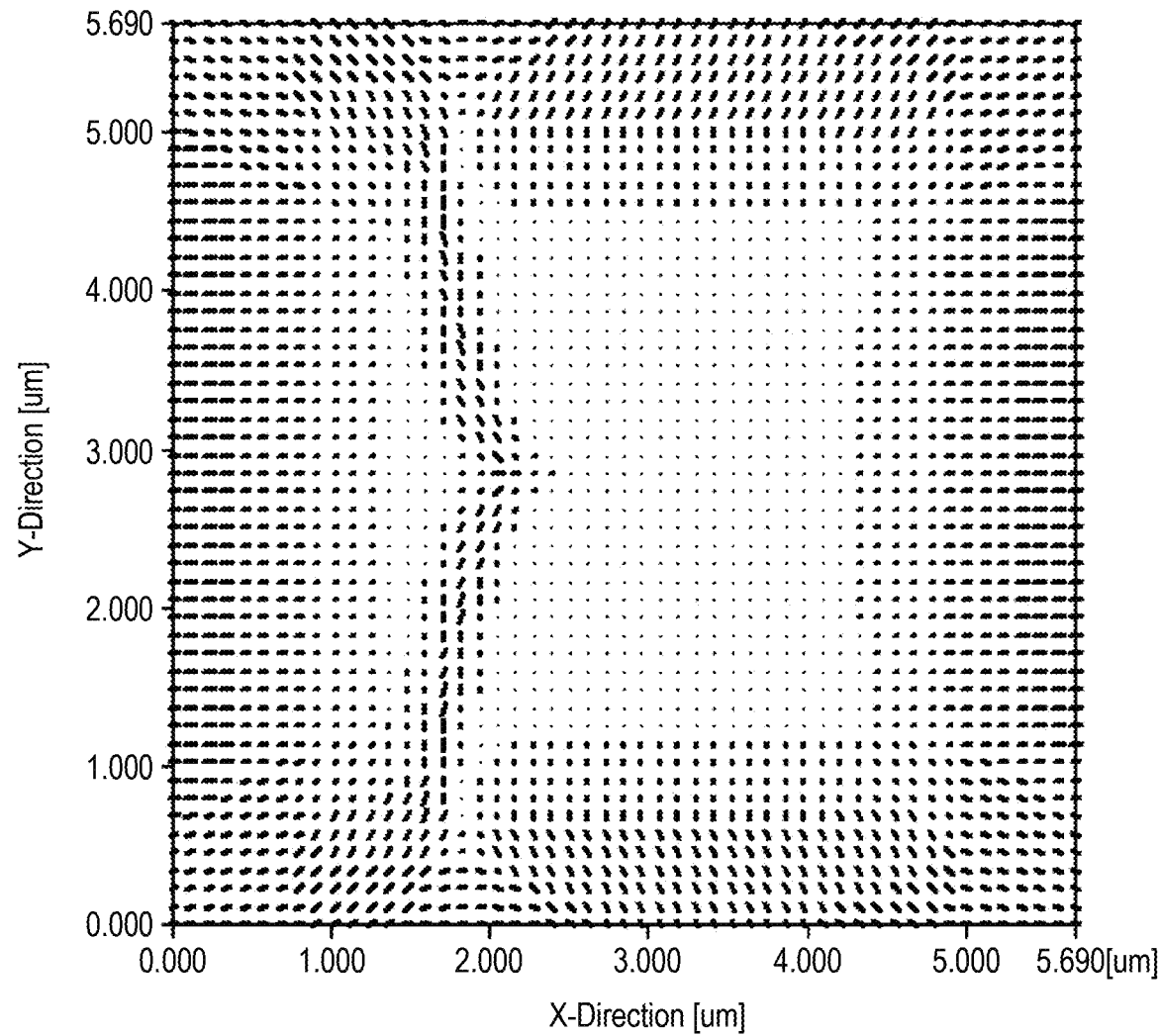
FIG. 12A is a top-view of a 4 μm square pixel at 5V with 4 adjacent pixels at 0V showing the orientation of the liquid crystals with a pre-tilt angle of 3 degrees.
Figure 12B:
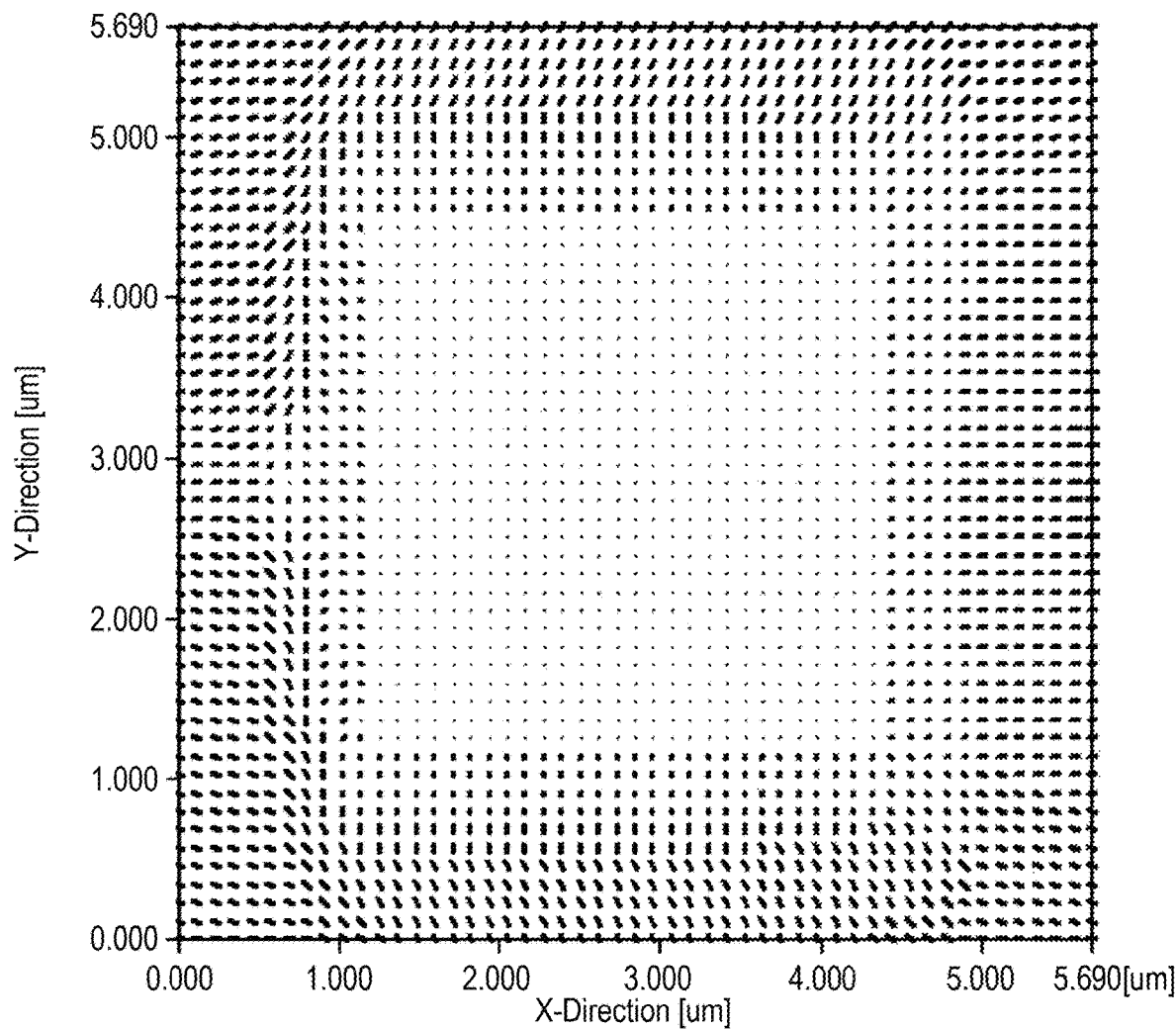
FIG. 12B is a top-view of the same pixel with a pre-tilt angle of 7 degrees.

Likewise, FIG. 12 show a top view of liquid crystals of a single pixel surrounded by four adjacent pixels causing fringing fields. FIG. 12A is achieved with a pre-tilt of 3 degrees and FIG. 12B is achieved with 7 degrees. The central pixel is in the "ON" state (i.e. 5V) and the four surrounding pixels are in the "OFF" state (i.e. 0V). Increasing the pre-tilt angle on each substrate to greater than 5 degrees is found to remove the disclination from the active area of the pixel.

The inventors have measured the effectiveness of using a pre-tilt angle greater than 5 degrees at reducing the effect of the disclination for a variety of cells. Specifically, the inventors have measured the effect of the pre-tilt angle on the bulk retardation of a cell having a disclination. For conciseness, only a sample of results are provided in the present disclosure.

Figure 13A:
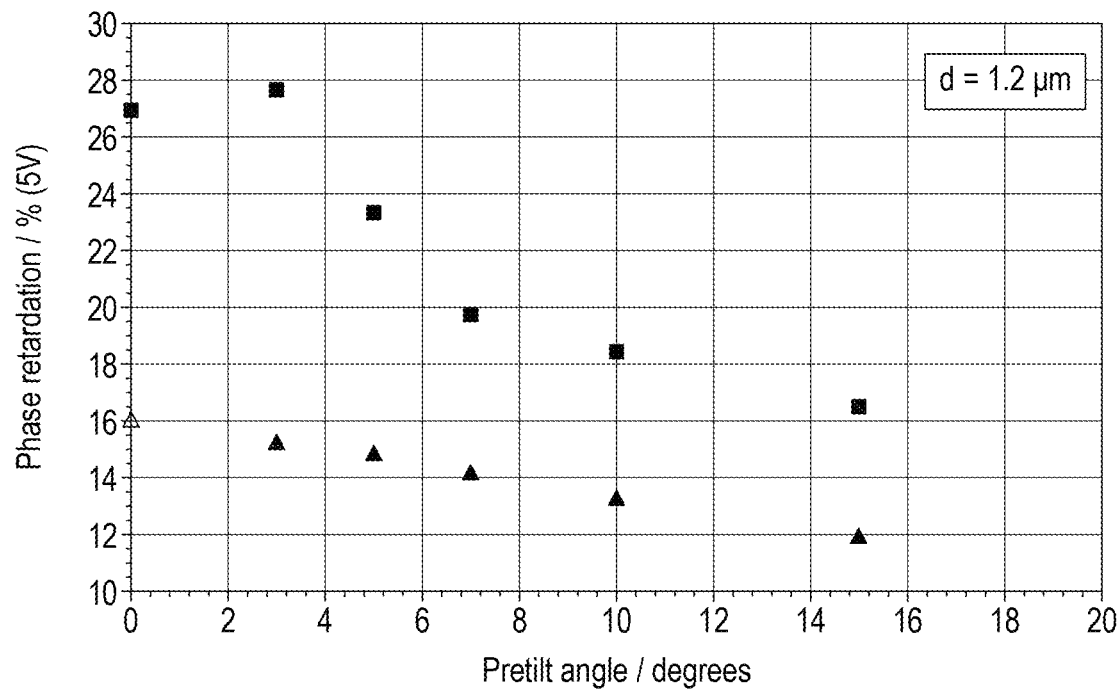
FIG. 13A shows the effect of pre-tilt angle on the theoretical phase retardation (no disclination) using triangular data point markers and the actual phase retardation (owing to the disclination) using square data point markers, with a 1.2 µm cell gap.

FIG. 13A shows how the pre-tilt angle, in a cell having a cell gap of 1.2 μm, reduces the phase retardation error caused by the fringing fields which result from the high density of high birefringence pixels. In this example, the pixel comprising commercially-available nematic liquid crystal is driven at 5V and is surrounded on all sides by "OFF" pixels. The birefringence of the liquid crystal is 0.235 (at 650 nm). The x-axis is the phase retardation as a percentage of the maximum phase retardation (i.e. at 0V). The phase retardation does not reach zero because 5V is insufficient to fully-align the liquid crystals in the vertical direction. The square-shaped data points represent the measured phase retardation, including the disclination, and the triangle-shaped data points represent the theoretical phase retardation which should be achieved if the disclination were not present. It can be seen from FIG. 13A that the phase retardation approaches the theoretical value as the pre-tilt angle is increased. That is, the difference between the measured phase retardation and theoretical phase retardation decreases as the pre-tilt angle is increased. The inventors have shown that the improvement is most pronounced between 5 and 15 degrees. Increasing the pre-tilt from 3 degrees to at least 5 degrees is found to reduce the phase retardation error from 28% to 23%. When the pre-tilt angle is further increased to 7 degrees, the total phase loss has been reduced below 20%. Above 15 degrees, little further improvement was observed with this cell. Little further improvement beyond 15 degrees pre-tilt was also observed with a cell gap of 5 μm.

Figure 13B:
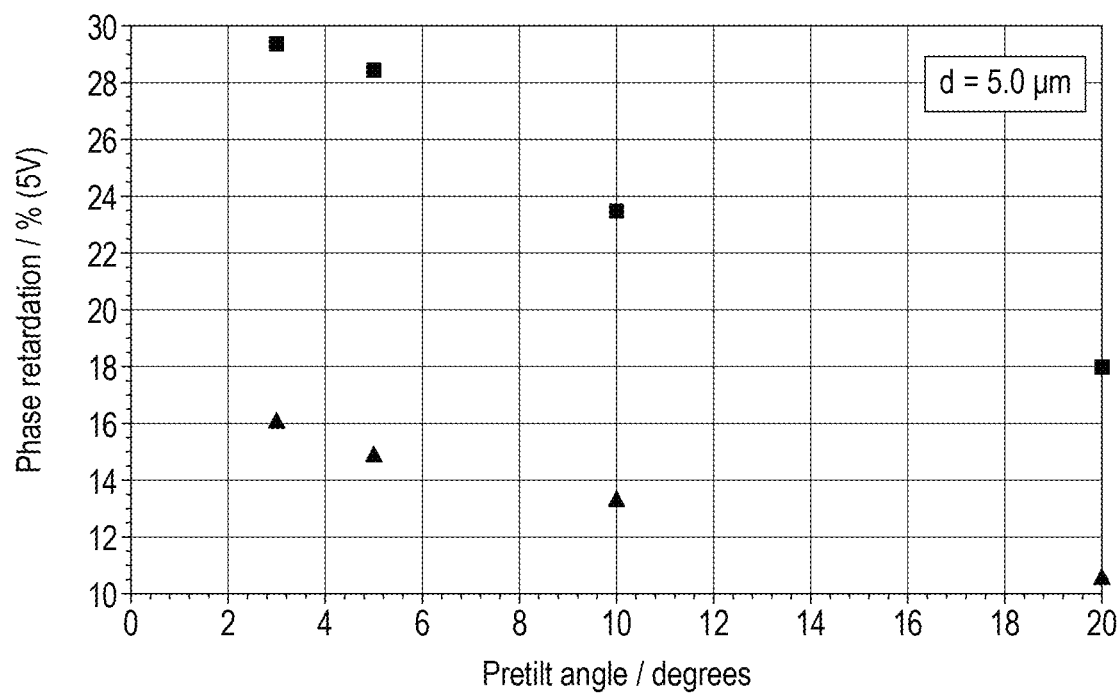
FIG. 13B shows the same as FIG. 13A with a 5 µm cell gap.

FIG. 13B shows the same as FIG. 13A but for a cell gap of 5 μm. Notably, the improvement with pre-tilt is significantly less prominent at this higher cell gap. In fact, the inventors have found that having a pre-tilt angle greater than 5 degrees is most effective when the cell gap is less than 3 μm but greater than 0.5 μm.

Additional Features

In some embodiments, the light source is a laser such as a laser diode. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the size of the hologram is less than the size of the spatial light modulator.

In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator.

The size of the holographic replay field (i.e. the physical or spatial extent of the holographic reconstruction) is determined by the pixel spacing of the spatial light modulator (i.e. the distance between adjacent light-modulating elements, or pixels, of the spatial light modulator). The smallest feature which may be formed in the replay field may be called a "resolution element", "image spot" or an "image pixel". Typically, each pixel of the spatial light modulator has a quadrangular shape. The Fourier transform of a quadrangular aperture is a sinc function and therefore each image pixel is a sine function. More specifically, the spatial intensity distribution of each image pixel on the replay field is a since function. Each sinc function may be considered as comprising a peak-intensity primary diffractive order and a series of decreasing-intensity higher diffractive orders extending radially away from the primary order. The size of each sinc function (i.e. the physical or spatial extent of each sinc function) is determined by the size of the spatial light modulator (i.e. the physical or spatial extent of the aperture formed by the array of light-modulating elements or spatial light modulator pixels). Specifically, the larger the aperture formed by the array of light-modulating pixels, the smaller the image pixels. It is usually desirable to have small image pixels.

In some embodiments, the technique of "tiling" is implemented to increase image quality. Specifically, some embodiments implement the technique of tiling to minimise the size of the image pixels whilst maximising the amount of signal content going into the holographic reconstruction.

In some embodiments, the holographic pattern written to the spatial light modulator comprises at least one whole tile (that is, the complete hologram) and at least one fraction of a tile (that is, a continuous subset of pixels of the hologram).

The holographic reconstruction is created within the zeroth diffraction order of the overall window defined by the spatial light modulator. It is preferred that the first and subsequent orders are displaced far enough so as not to overlap with the image and so that they may be blocked using a spatial filter.

In embodiments, the holographic reconstruction is colour. In examples disclosed herein, three different colour light sources and three corresponding SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific.

For example, in a video at 25 frames per second, the first frame would be produced by firing the red laser for 1/75th of a second, then the green laser would be fired for 1/75th of a second, and finally the blue laser would be fired for 1/75th of a second. The next frame is then produced, starting with the red laser, and so on.

An advantage of FSC method is that the whole SLM is used for each colour. This means that the quality of the three colour images produced will not be compromised because all pixels of the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496, 108 which is hereby incorporated in its entirety by reference.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A holographic projector comprising:
a reflective liquid crystal display device comprising:
a light-modulating layer between a first substrate and a second substrate substantially parallel to the first substrate, wherein the light-modulating layer comprises planar-aligned nematic non-twisted liquid crystals having positive dielectric anisotropy;
wherein the first substrate is substantially transparent and comprises a first alignment layer arranged to impart a first pre-tilt angle $\theta_1$ on liquid crystals proximate the first substrate, wherein $\theta_1 > 5°$,
wherein the second substrate is substantially reflective and comprises a second alignment layer arranged to impart a second pre-tilt angle $\theta_2$ on liquid crystals proximate the second substrate, wherein $\theta_2 > 5°$;
a plurality of pixels defined on the light-modulating layer having a pixel repeat distance x, wherein x≤10 μm,
wherein 0.5 μm≤d≤3 μm, wherein d is a distance between inside faces of the first substrate and the second substrate, and $\Delta n \geq 0.20$, wherein $\Delta n$ is a birefringence of the nematic non-twisted liquid crystals; and
a display driver arranged to drive the reflective liquid crystal display device to display a hologram by independently-driving each pixel at a respective modulation level selected from a plurality of modulation levels having a phase modulation value.

2. The holographic projector as claimed in claim 1 wherein $\theta_1 \leq 15°$.

3. The holographic projector as claimed in claim 1 wherein $\theta_2 \leq 15°$.

4. The holographic projector as claimed in claim 1 wherein x≤6 μm.

5. The holographic projector as claimed in claim 1 wherein 1 μm≤d≤3 μm.

6. The holographic projector as claimed in claim 1 wherein $\Delta n \geq 0.25$.

7. The holographic projector as claimed in claim 1 wherein $\Delta n \leq 0.70$.

8. The holographic projector as claimed in claim 1 wherein the first pre-tilt angle and second pre-tilt angle are parallel.

9. The holographic projector as claimed in claim 1 wherein the first pre-tilt angle and second pre-tilt angle are substantially equal.

10. The holographic projector as claimed in claim 1 wherein the first alignment layer is further arranged to impart a first azimuthal angle on liquid crystals proximate the first substrate and the second alignment layer is further arranged to impart a second azimuthal angle on liquid crystals proximate the second substrate, wherein the first azimuthal angle and second azimuthal angle are substantially parallel.

11. The holographic projector as claimed in claim 10 wherein the holographic projector further comprises a light source arranged to irradiate the reflective liquid crystal display device with linearly polarised light having a polarisation direction substantially parallel to the first azimuthal angle.

12. The holographic projector as claimed in claim 1 wherein adjacent pixels of the plurality of pixels are spaced by 0.1 to 0.4 µm.

13. The holographic projector as claimed in claim 1 wherein $\theta_1 \leq 15°$; and $\theta_2 \leq 15°$.

14. The holographic projector as claimed in claim 13 wherein x≤6 µm; and 1 µm≤d≤3 µm.

15. The holographic projector as claimed in claim 14 wherein $0.70 \geq \Delta n \geq 0.25$.

16. The holographic projector as claimed in claim 1 wherein $0.70 \geq \Delta n \geq 0.25$.

17. The holographic projector as claimed in claim 1 wherein x≤6 µm; and 1 µm≤d≤3 µm.

18. A method of reducing fringing field effects in a reflective liquid crystal device, wherein the reflective liquid crystal device comprises:
 a light-modulating layer between a first substrate and a second substrate substantially parallel to the first substrate, wherein the light-modulating layer comprises planar-aligned non-twisted nematic liquid crystals having positive dielectric anisotropy, wherein the first substrate is substantially transparent and comprises a first alignment layer and the second substrate is substantially reflective and comprises a second alignment layer;
 a plurality of pixels defined on the light-modulating layer having a pixel repeat distance x, wherein x≤10 µm and 0.5 µm≤d≤3 µm, wherein d is a distance between inside faces of the first substrate and the second substrate and $\Delta n \geq 0.20$, wherein $\Delta n$ is a birefringence of the nematic non-twisted liquid crystals;
and the method comprises:
 imparting a first pre-tilt angle $\theta_1$ on liquid crystals proximate the first substrate, wherein $\theta_1 > 5°$; and
 imparting a second pre-tilt angle $\theta_2$ on liquid crystals proximate the second substrate, wherein $\theta_2 > 5°$.

19. The method as claimed in claim 18 wherein the step of imparting a first/second pre-tilt angle comprises rubbing the first alignment layer in a first direction and the second alignment layer in a second direction, wherein the first direction is opposite to the second direction.

20. The method as claimed in claim 18 further comprising driving the reflective liquid crystal device to display a hologram by independently-driving each pixel at a respective modulation level selected from a plurality of modulation levels having a phase modulation value.

* * * * *